US010666690B2

(12) United States Patent
Friend et al.

(10) Patent No.: US 10,666,690 B2
(45) Date of Patent: May 26, 2020

(54) RESOURCE-RELATED CONTENT DISTRIBUTION HUB

(71) Applicants: Erik Friend, Foster City, CA (US); Jason Blackhurst, San Francisco, CA (US); Quan Wang, Foster City, CA (US)

(72) Inventors: Erik Friend, Foster City, CA (US); Jason Blackhurst, San Francisco, CA (US); Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 155 days.

(21) Appl. No.: 15/221,406

(22) Filed: Jul. 27, 2016

(65) Prior Publication Data

US 2018/0034862 A1    Feb. 1, 2018

(51) Int. Cl.
*H04L 29/06*    (2006.01)
*G06Q 30/02*    (2012.01)
*H04L 29/08*    (2006.01)

(52) U.S. Cl.
CPC ..... *H04L 65/1063* (2013.01); *G06Q 30/0241* (2013.01); *H04L 65/105* (2013.01); *H04L 65/1069* (2013.01); *H04L 65/605* (2013.01); *H04L 67/06* (2013.01)

(58) Field of Classification Search
None
See application file for complete search history.

(56) References Cited

U.S. PATENT DOCUMENTS

| 7,975,062 B2 | 7/2011 | Krikorian |
| 8,229,792 B2 | 7/2012 | Parkes |

(Continued)

FOREIGN PATENT DOCUMENTS

| IN | 2007KN04005 | 5/2008 |
| KR | 1020120038304 | 4/2012 |
| WO | 2013012952 | 1/2013 |

OTHER PUBLICATIONS

Market View, TV Sync: How to Tell a Connected Brand Story Across Screens, http://wywy.com/market-view/tv-sync-connected-brand-story-across-screens/, Visited Jul. 14, 2017, 6 pages.

(Continued)

*Primary Examiner* — Thomas J Dailey
(74) *Attorney, Agent, or Firm* — Kilpatrick Townsend & Stockton LLP

(57) ABSTRACT

Described herein are systems and methods in which resource-related content is provided to a number of mobile devices. In some embodiments, as a content provider streams a media presentation or a live real-world event occurs, it may also provide an indication of a resource to a content distribution hub. Upon receiving that indication of the resource, the content distribution hub may identify and/or generate resource-related content relevant to the indicated resource. The resource-related content may then be distributed to a number of subscriber devices according to subscription data maintained by the content distribution hub. In some embodiments, the content hub is also configured to initiate transactions related to the resources.

20 Claims, 7 Drawing Sheets

(56) References Cited

U.S. PATENT DOCUMENTS

| | | | |
|---|---|---|---|
| 8,464,289 B2* | 6/2013 | Pan | H04N 21/2668 725/10 |
| 8,843,393 B2* | 9/2014 | Beavers | G06Q 30/0253 705/14.4 |
| 8,930,575 B1 | 1/2015 | Bianco | |
| 2010/0153831 A1 | 6/2010 | Beaton | |
| 2011/0145857 A1* | 6/2011 | Agarwal | G06Q 30/02 725/32 |
| 2013/0144716 A1* | 6/2013 | Xiong | H04N 21/251 705/14.52 |
| 2013/0227074 A1* | 8/2013 | Odlund | H04N 21/2183 709/219 |
| 2013/0263180 A1* | 10/2013 | Yang | H04N 21/25891 725/32 |
| 2014/0074712 A1 | 3/2014 | Palmer | |
| 2014/0115627 A1 | 4/2014 | Lee et al. | |
| 2014/0136596 A1* | 5/2014 | Watfa | G06Q 30/0241 709/203 |
| 2014/0173653 A1 | 6/2014 | Waibel et al. | |
| 2015/0304726 A1 | 10/2015 | White | |
| 2016/0205028 A1* | 7/2016 | Luna | H04W 4/18 709/233 |
| 2016/0205442 A1* | 7/2016 | Yee | G06Q 30/02 725/34 |

OTHER PUBLICATIONS

Jay Moulding, Increasing Evidence That Real-tie Synchronized TV and Digital Advertising Works, http://www.v-net.tv/increasing-evidence-that-real-time-synchronized-tv-and-digital-advertising-works, Jul. 27, 2016, 5 pages, Visited Jul. 14, 2017.

PCT/US2017/042348, "International Search Report and Written Opinion", Aug. 28, 2017, 12 pages.

\* cited by examiner

RESOURCE-RELATED CONTENT DISTRIBUTION HUB

BACKGROUND

As a growing number of users become exposed to items depicted in media, the users often become interested in those items. However, often users are not able to identify those items at the time that the item is being depicted (when the user is most interested in the item). In recent years, content providers have begun to develop systems to enable users to be provided with targeted content (e.g., systems which provide resource-related content in which a user is likely to be interested). However, these systems are incapable of efficiently providing that resource-related content to a user at the time that the user is most likely to be interested in the item.

Embodiments of the invention address these and other problems, individually and collectively.

BRIEF SUMMARY

Embodiments of the invention are directed to systems and methods in which resource-related content is provided to a number of mobile devices. The resource-related content is supplemental to a media presentation or live event/activity provided by a content provider. In some embodiments, as a content provider streams a media presentation or hosts a real-world activity, it may also provide an indication of an associated resource to a content distribution hub. Upon receiving that indication, the content distribution hub may identify or determine resource-related content that is relevant to the indicated resource. The resource-related content may then be distributed to a number of subscriber devices according to subscription data maintained by the content distribution hub. In some embodiments, the subscriber devices may be mobile devices. In some embodiments, the subscriber devices may be mobile application servers that provide gateway services or support for a number of mobile devices and the like.

One embodiment of the invention is directed to a method performed by a server device that comprises receiving, from a content provider, information associated with an item related to a presented data file or live event and generating a notification to be associated with the item, wherein the notification includes information for conducting a transaction with respect to the item. The method further comprises providing, while the data file is being presented or live event is taking place, the notification to one or more subscriber devices that are subscribed to the presented content/event, receiving, with respect to the provided notification, a request to complete a transaction for the item, and initiating the requested transaction for the item.

Another embodiment of the invention is directed to a server apparatus comprising one or more processors, and a memory including instructions that, when executed by the one or more processors, cause the one or more processors to receive, from one or more content providers, an indication of a resource related to a media presentation and identify, within a data store, at least one resource-related content associated with the indicated resource. The instructions further cause the one or more processors to determine, based at least in part on subscription data maintained by the server apparatus, a plurality of subscriber devices to be provided the identified resource-related content, and to distribute, to each of the subscriber devices, the identified resource-related content.

Another embodiment of the invention is directed to a transaction management system comprising a processor, and a memory including instructions that, when executed with the processor, cause the transaction management system to, at least receive, in relation to a media or live presentation, information associated with a resource to be added to an electronic catalog and generate an entry in the electronic catalog for the resource. The instructions further cause the transaction management system to identify, based on subscription data maintained by the transaction management system, a plurality of subscriber devices to be provided a notification associated with the entry in the electronic catalog, and provide, to each of the identified plurality of subscriber devices, the generated notification.

These and other embodiments of the invention are described in further detail below.

DETAILED DESCRIPTION

Figure 1:
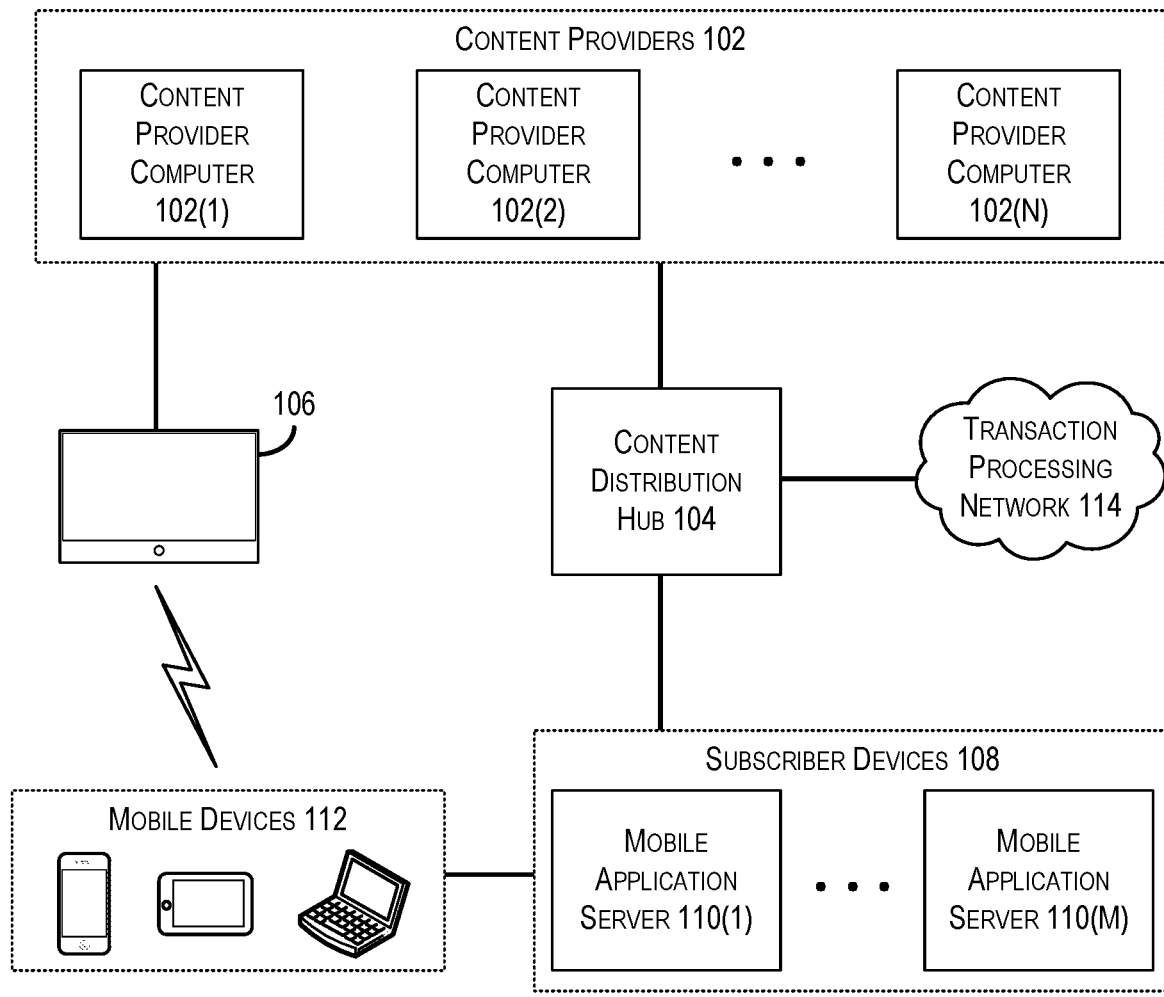
FIG. 1 depicts an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "content provider computer" may include a computing device capable of providing information associated with media and/or resource-related content. In some embodiments, a content provider computer may provide a resource identifier to a content distribution hub. In some embodiments, the content provider computer may be a provider of streaming data file. For example, the content provider computer may be a provider of a streaming media service, such as a video streaming or webcam streaming service. In some embodiments, the content provider computer may be a computing device that manages information related to a live or real-time event (i.e., an event occurring at the present time). In at least some of these embodiments, the live or real-time event may be an event for which no streaming data file is provided (e.g., an untelevised event).

A "content distribution hub" may include any computing device capable of distributing resource-related content amongst various subscriber devices. In some embodiments, a content distribution hub may include an event processing engine configured to process received resource identifiers and provide notifications to subscribers that are subscribed to those resource identifiers. The content distribution hub may be configured to receive an indication of a resource from a content provider, identify the resource and/or content related to the resource (resource-related content), and distribute the identified content to subscriber devices based on subscription data. In some embodiments, a content distribution hub may identify advertisements or other notifications related to the identified resource and may subsequently distribute those notifications to the subscriber devices. In some embodiments, the content distribution hub may provide a media file or portion of a media file received from content providers to the subscriber devices.

An "electronic catalog" may include any collection of resource information. In some embodiments, an electronic catalog may be maintained by an electronic retailer, the content distribution hub, or other resource provider. An electronic catalog may comprise a number of entries in a database. Each entry in an electronic catalog may pertain to a different resource or group of resources.

A "media presentation device" may be any electronic device configured to execute a provided media file. The media presentation device may include one or more processors and a memory that includes computer executable instructions to be executed by the one or more processors, as well as an output component configured to present content within the media file to a user. For example, a media presentation device may be a television.

A "mobile application server" may be any computing device configured to provide processing support for a mobile application installed on, and executed from, a mobile device. In some embodiments, a mobile application server may maintain account information associated with a particular mobile device and/or user. In some embodiments, an account maintained on a mobile application server may be accessed via the mobile application installed on a mobile device and/or via an internet connection. In some embodiments, a user may be required to log into an account maintained on a mobile application server. In some embodiments, a mobile device identifier may be associated with the account, such that the account is accessed automatically when the mobile application is executed.

A "mobile device" may include any suitable device that can be easily transported by user. Examples of mobile devices are described in detail below.

A "resource offer" may include any offer to conduct a transaction associated with a resource. In some embodiments, a resource offer may be an offer to sell the resource. In some embodiments, the resource offer may be an offer to redirect a browser application to a web page dedicated to the resource.

A "resource-related content" may include any content that is associated with a particular resource. In some embodiments, resource-related content may refer to a media file that depicts the resource (e.g., a video file that depicts a tennis player holding a particular tennis racket). In some embodiments, the resource-related content may be an advertisement or other notification associated with a particular resource. In some embodiments, the resource-related content may comprise a link or address of a webpage associated with the resource. In some embodiments, resource-related content may comprise information related to an auction or listing for the resource.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "streaming" may refer to any files provided to a computing entity in a continuous or semi-continuous stream of data. Streaming media may be used to refer to media files that are buffered and/or executed by a media presentation device (e.g., television, ebook reader, mp3 player, etc.) upon being accessed. In some embodiments, streaming data file may refer to a series of media files that are downloaded by a recipient device (e.g., a media presentation device) in a sequence. For example, a content provider computer may make a series of data files available and may provide a media presentation device with the location (e.g., via a uniform resource locator (URL)) of each of the data files. In this example, the media presentation device may access each of the data files at the indicated location in a specified order.

A "transaction" may be any interaction or exchange between two or more parties. For example, a transaction may include a first entity requesting resources from a second entity. In this example, the transaction is completed when the resources are either provided to the first entity or the transaction is declined.

A "token" may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

Details of some embodiments of the present invention will now be described.

FIG. 1 depicts an example system architecture capable of implementing at least some embodiments of the current disclosure. In FIG. 1, a plurality of content providers 102 (1-N) may be in communication with a content distribution hub 104. Content providers 102 may provide content to media presentation devices 106. The content distribution hub 104 may be configured to distribute data files received from the content providers 102 to a plurality of subscriber devices 108. For example, the subscriber devices 108 may include a number of mobile application servers 110 (1-M), each of which may be in communication with a number of mobile devices 112. In some embodiments, the content distribution hub 104 may be in communication with a transaction processing network 114.

In accordance with at least some embodiments, the content provider computers 102 may be any computing device, including a remotely located server computer, configured to provide a media file to recipient devices (e.g., a media presentation device 106 and/or a content distribution hub 104). In some embodiments, a content provider computer 102 may be operated by a provider of streaming data file. In some embodiments, the content provider computer 102 may make a series of data files (e.g., media files) available and may provide the recipient device with the location (e.g., via a uniform resource locator (URL)) of each of the data files. In this example, the recipient device may access each of the data files at the indicated location in a specified order. In some embodiments, the data files may be buffered and/or executed by the recipient device upon being accessed.

It should be noted that in some embodiments, the content provider computers 102 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In some embodiments, content provider computers 102 may be configured to provide data files to a number of media presentation devices 106 as well as to a content distribution hub 104. The data files provided to the content distribution hub 104 may include an indication of a resource related to the data file. The content provider computers 102 may provide any suitable service and/or processing associated with the data files that it provides. For example, the content provider computers 102 may identify an appropriate format for the data files to be provided to the media presentation device. In another example, the content provider computers 102 may provide decryption keys to the media presentation device to be used by the media presentation device in decrypting received data files. In some embodiments, the content provider computers 102 may be configured to append metadata to a data file based on input received from a user.

A content distribution hub 104 may be any computing device configured to receive data files from the content providers 102 and provide the data files to subscriber devices 108 in accordance with maintained subscription data. An example content distribution hub 104 is described in greater detail with respect to FIG. 2. In some embodiments, a content distribution hub 104 may also be configured to initiate a transaction associated with a resource. For example, the content distribution hub 104 may be configured to initiate a transaction by generating an authorization request message to be provided to an issuer computer. In this example, the content distribution hub 104 may be configured to initiate the transaction upon receiving a transaction request from a subscriber device 108.

Processing performed by the content distribution hub 104 may be performed by multiple processing nodes. Each processing node may represent a separate computing device (e.g., a separate server), a virtual machine, a separate thread in a multi-threaded system, or any other suitable processing device. A processing node may be a computer processing device that includes a central processing unit (CPU) with a large amount of random access memory (RAM) and at least some data storage. In some embodiments, each processing node may be configured to retrieve and process event notifications published by other components of the content distribution hub 104.

A mobile application server 110 may maintain user account information associated with a mobile device 112. A mobile application installed on, and executed from, the mobile device 112 may establish a communication session with the mobile application server 110 upon its execution. In this example, the mobile application server 110 may convey resource-related content to the mobile application via the established communication session. By way of illustration, the mobile application server 110 may provide resource-related content received from the content distribution hub 104 to the mobile device 112.

A mobile device 112 may be any portable electronic device. In some embodiments, the mobile device 112 may be a computing device, such as a tablet, personal data assistant (PDA), or smart phone. In some embodiments, a mobile device may be a wearable object, such as a smart watch or other clothing or accessory item. In some embodiments, the mobile device may be an onboard vehicle entertainment system. In some embodiments, the mobile device 112 may be capable of communicating with a media presentation device 106 to receive an indication of data file currently being presented by the media presentation device.

In some examples, the transaction processing network 114 may include any one or a combination of many different types of networks, such as cable networks, the Internet, wireless networks, cellular networks, and other private and/or public networks. In addition, the transaction processing network 114 may comprise multiple different networks. In some embodiments, the transaction processing network 114 may be a payment processing network.

For simplicity of illustration, a certain number of components are shown in FIG. 1. It is understood, however, that embodiments of the invention may include more than one of each component. For example, although depicted as separate entities in FIG. 1, the content distribution hub 104 may also act as a mobile application server 110. In this example, the content distribution hub 104 may distribute resource-related content directly to various mobile devices 112. In addition, some embodiments of the invention may include fewer than or greater than all of the components shown in FIG. 1. In addition, the components in FIG. 1 may communicate via any suitable communication medium (including the internet), using any suitable communications policy.

Figure 2:
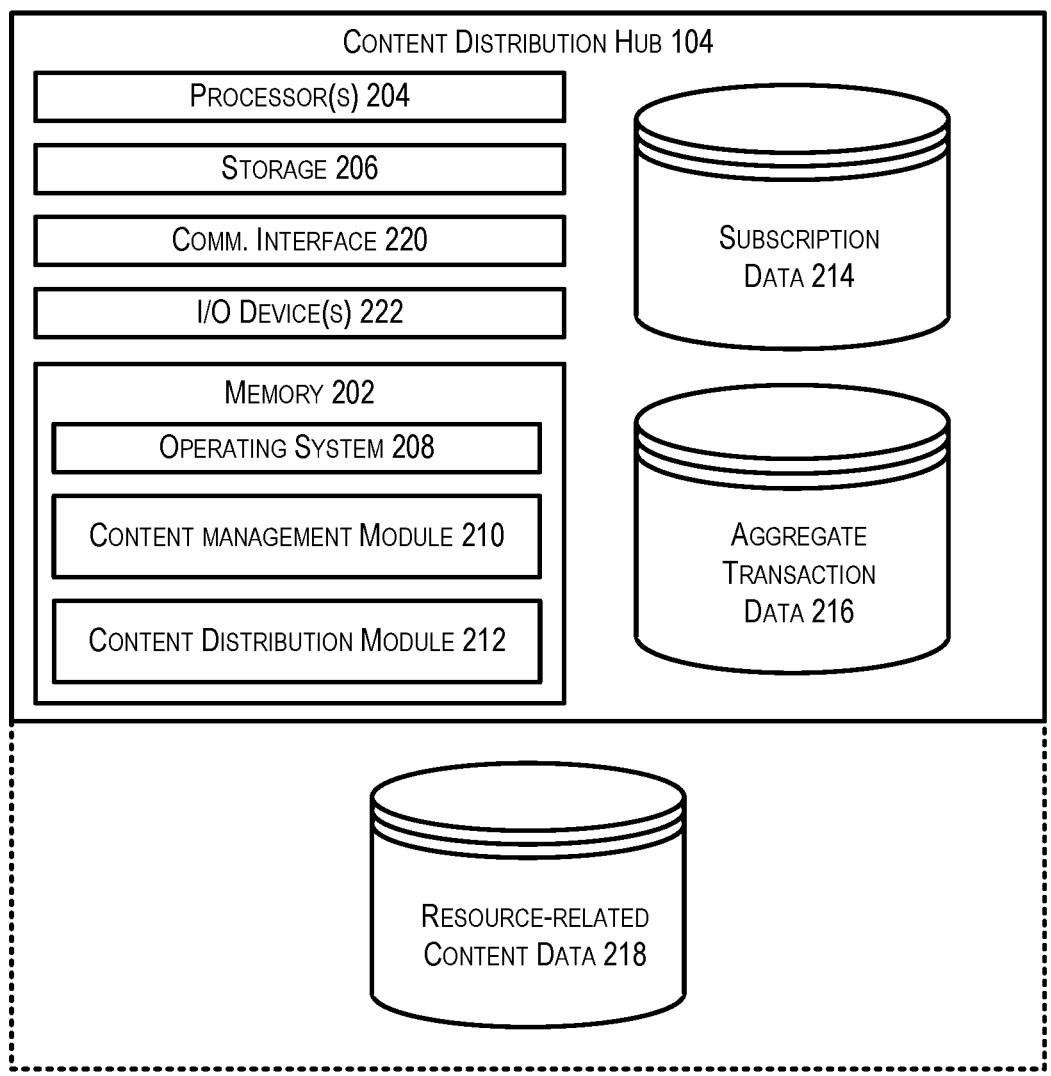
FIG. 2 depicts an example content distribution hub configured to receive media files from a content provider and subsequently distribute the received media files to subscriber devices in accordance with maintained subscription data.

FIG. 2 depicts an example content distribution hub configured to receive data files from a content provider and subsequently distribute the received data files to subscriber devices in accordance with maintained subscription data. The content distribution hub 104 may be an example content distribution hub 104 of FIG. 1.

The content distribution hub 104 may be any type of computing device(s) capable of receiving data files (e.g., media files), identifying resource information associated with the data files, identifying subscribers to be associated with the data files based on the resource information, and providing the data files to those subscribers. In at least some embodiments, the content distribution hub 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of content distribution hub 104, the memory 202 may be volatile (such as random access memory (RAM)) and/or non-volatile (such as read-only memory (ROM), flash memory, etc.). The content distribution hub 104 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the content distribution hub 104. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for managing data files received from content providers and identifying resources associated with those data files (content management module 210) and/or a module for distributing data files to subscribers in accordance with content subscription policies (content distribution module 212). The memory 202 may also include subscription data 214, which provides data associated with subscriber devices. For example, the subscription data 214 may include an indication of a type of data file or resource-related information to be provided to a subscriber device. In addition, the memory 202 may include aggregate transaction data 216, which provides information associated with transactions for a resource (e.g., auction or loyalty information). In some embodiments, the content distribution hub 104 may include a data store of resource-related content data 218. Although depicted in FIG. 2 as included within the content distribution hub 104, the resource-related content data 218 may be maintained by an entity external to the content distribution hub 104. For example, the resource-related content data 218 may be maintained by a computing device owned and/or operated by an advertisement servicing agency. In some embodiments, each entry in the resource-related content data 218 may include at least a resource-related content and an identifier associated with the resource.

In some embodiments, the content management module 210 may, in conjunction with the processor 204, be configured to receive data files from content providers and identify resources related to the received data files. In some embodiments, the data file may include an indication of a resource to be associated with the received data file. For example, a content provider may stream a video file to the content hub 104. The video file may include a metadata section that indicates that a specific item is depicted in the video file. In some embodiments, the content provider may provide only an indication of a resource that is currently relevant (e.g., without providing data files to the content distribution hub 104). Once the content management module 210 receives an indication of a resource, it may query a data store to obtain additional information associated with the resource. In some embodiments, the content management module 210 may identify advertisements associated with the resource. In some embodiments, the content management module 210 may be configured to alter the received data file based on the identified resource. For example, in the case that the data file is a video file or image, the content management module 210 may edit the data file to include an overlaid logo or other brand indicator.

In some embodiments, the content distribution module 212 may, in conjunction with the processor 204, be configured to determine a set of subscribers to which resource-related content should be distributed. In some embodiments, the content distribution module 212 may query subscription data 214 to determine which subscribers have subscribed to the resource-related content to be distributed. In some embodiments, the subscription data 214 may include an indication of specific resources and/or types of resources that a particular subscriber should receive resource-related content related to. Upon determining the set of subscribers to which the resource-related content should be distributed, the content distribution module 212 may be configured to cause the processors 204 to distribute the resource-related content to the determined set of subscribers. In some embodiments, this may be done by streaming the resource-related content to the subscribers. In some embodiments, the content hub 104 may provide a location of files associated with the resource-related content to the subscriber (e.g., a URL or other address).

The content distribution hub 104 may also contain a communication interface(s) 218 that enable the content distribution hub 104 to communicate with a stored database, another computing device or server, one or more remote devices, other appliance devices, and/or any other suitable electronic devices. In some embodiments, the communication interface 220 may enable the content distribution hub 104 to communicate with other electronic devices on a network (e.g., on a private network). The content distribution hub 104 may also include input/output (I/O) device(s) and/or ports 222, such as for enabling connection with a keyboard, a mouse, a pen, a voice input device, a touch input device, a display, speakers, a printer, etc.

Figure 3:
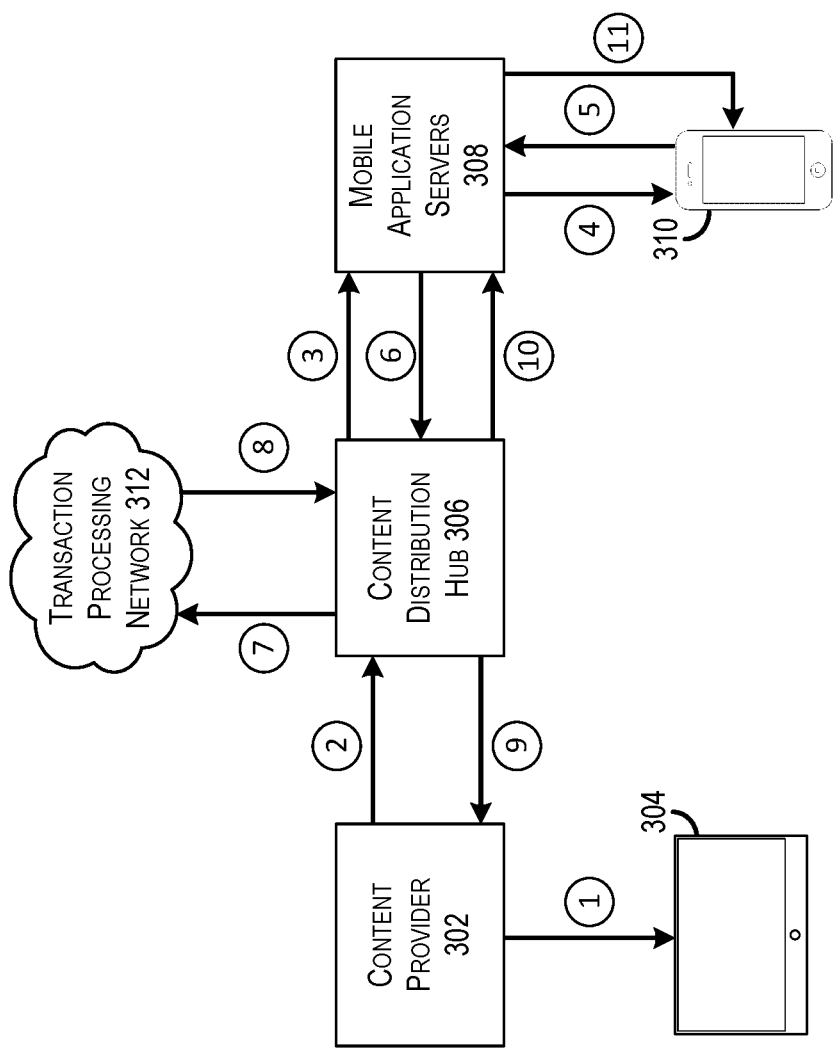
FIG. 3 depicts an example data flow that may be implemented to provide supplemental resource-related content associated with streaming media content in accordance with at least some embodiments.

FIG. 3 depicts an example data flow that may be implemented to provide supplemental resource-related content associated with streaming media content in accordance with at least some embodiments. The data flow depicted in FIG. 3, may be implemented at least by the example architecture depicted in FIG. 1.

At step 1 of the data flow, a content provider 302 may provide data file to a number of media presentation devices 304. Content provider 302 may be an example content provider 102 depicted in FIG. 1. In some embodiments, the data file may be generated from a live event (e.g., a sporting event or concert). The data file may be provided to the media presentation devices in real-time (as it is occurring) or in substantially real-time (e.g., shortly after it is generated). In some embodiments, the content provider 302 may use a variety of available content distribution methods to provide the content to the media presentation devices 304.

At step 2 of the data flow, a content provider 302 may provide an indication of a resource associated with the content or live event to a content hub 306. In some embodiments, the content provider 302 may provide content to the content hub (e.g., the data file provided to the media presentation devices 304). In some embodiments, the content provider may simply provide an indication of a resource associated with the content that is currently being provided to the media presentation devices. In some embodiments, the indication of the resource may be input at the content provider 302 via an administrator or curator. For example, as content is being generated (e.g., as a live event is being filmed or taking place), a curator may indicate a product or service that is currently being filmed or is related to the content (e.g., shoes that are being worn by a currently depicted athlete or memorabilia of the musical performer taking the stage). This indication may subsequently be provided to the content hub 306, with or without the actual generated content. For example, the content provider 302 may provide a set of item identifiers to the content hub 306. In some embodiments, the resource may be selected from item data (e.g., an electronic catalog) maintained by the content hub 306 or another external source.

Upon receiving the resource identifier, the content hub 306 may identify the indicated resource. For example, the content hub 306 may query an item data store based on item identifiers provided by the content provider 302. In some embodiments, the content hub 306 may identify advertisements or other notifications related to the identified resource. For example, the content hub 306 may maintain a number of advertisements, each of which is associated with a product or and/or service. Upon receiving an indication of a product from a content provider 302, the content hub 306 may retrieve a number of advertisements associated with that product from a data store. In some embodiments, the notifications related to the identified resource may be provided by the content provider 302 or another third party entity (i.e., an entity unaffiliated with the content hub 306).

At step 3 of the data flow, a content hub 306 may identify mobile application servers 308 that are subscribed to events pertaining to the identified resource. For example, during an enrollment process, a mobile application server 308 may indicate types of resources and/or resource-related content that it would like to be subscribed to. For example, a mobile application server 308 that provides support for a football-themed mobile application may subscribe to events associated with football games, such that each time the content hub 306 receives an identifier for a resource from the content provider 302 in relation to football-related content, the content hub 306 may provide notifications associated with that resource to the mobile application server. The mobile application server 308 may subsequently push those notifications out to mobile devices 310 that include an instance of the football-themed mobile application at step 4. Multiple mobile application servers 308 may subscribe to the same channels and/or resource-related content.

As pointed out above, at step 4 of the data flow resource-related content received by the mobile application server 308 may be provided to mobile devices which have stored on them an instance of a mobile application supported by the mobile application server 308. In some embodiments, the mobile device 310 may be associated with an account maintained by the mobile application server 308. In some embodiments, an account maintained by the mobile application server 308 may maintain an indication of user preferences and/or configuration settings.

Subscribers for particular resource-related content may be identified in a number of ways. For example, user preferences and/or configuration settings may include an indication of types of notifications or resource-related content that should be provided to a particular mobile device 310. For example, a user may log into an account maintained by the mobile application server 308 and indicate that he or she is interested in shoes. In this example, each time that the mobile application server 308 receives resource-related content from the content hub 306 related to shoes, it may provide that resource-related content to a mobile device 310 associated with the user. In some embodiments, a potential subscriber may be identified based on meeting specific conditions and/or criteria. For example, a user that is geographically located within a specified proximity of a content provider may be provided notifications related to that content provider. By way of illustration, a user participating in a city marathon may be wearing a smart wristband that is subscribed to a channel associated with the city marathon. In this illustrative example, the user may be provided (via the smart wristband) an indication of products available at upcoming checkpoints as the user approaches those checkpoints (e.g., enters within geographic proximity of the checkpoint). The user is then able to quickly select items for purchase so that the item is available to the user upon reaching the checkpoint. Furthering this example, the smart wristband may convey the user's registration number to the sponsor/provider of the item so that the provider may identify the user within the crowd and give the item to the user without the user having to stop.

In some embodiments, a mobile application stored on, and executed from, a mobile device 310 may enable a user to make a purchase of the resource related to the notification or resource-related content that was provided to the mobile device 310. In some embodiments, the mobile device 310 may be in communication with the content hub 306 via the mobile application server 308 in order to enable a user of the mobile device 310 to complete a purchase of the resource from the content hub 306. In some embodiments, the content hub may maintain an electronic catalog that includes one or more items available for purchase. The items may be available for a fixed price and/or via an auction. In some embodiments, a price for the resource presented to a user via the mobile device 310 may include a fee or commission added by the mobile application server 308. In some embodiments, a price at which a resource is available may be presented in one or more currencies or a combination of currencies. For example, the prices may reflect an amount of US dollars that a user may purchase the item for, an amount of loyalty points that the user may purchase the item for, or a combination of loyalty points and US dollars for which the item may be purchased. This will be described in greater detail with respect to FIG. 5.

At step 5 of the data flow, the mobile device may be used to initiate a transaction in association with a resource-related content. For example, a user of the mobile device 310 may, upon receiving the resource-related content elect to perform a transaction associated with the resource (e.g., purchase the resource, visit a website associated with the resource, etc.). In some embodiments, the user may be asked to enter payment information to be used in a transaction for the resource. In some embodiments, an ewallet application stored on, and executed from, the mobile device 310 may be used to provide payment information for the transaction. For example, the ewallet application may include a payment token or other payment information that, when initiated, causes the mobile device 310 to initiate the transaction using the token. In this example, the transaction may be initiated with the mobile application server 308 at step 5 via a transaction request.

In some embodiments, the content hub 306 may also act as a token service provider. For example, the content hub 306 may be configured to manage a set of tokens and process and authorize transactions directed to the set of tokens. The content hub 306 may be any computing device or plurality of computing devices configured to enable secure access to account information using tokens (substitute identifiers for account information). In particular, the content hub 306 may be configured to implement or be provided with access to a token service and/or a token vault. A token service may be any system capable of being used to generate, process, and maintain tokens and related account information such as dynamic keys. As indicated above, a token may have its own set of use restrictions, and token service may manage the deployment and usage of the tokens according to their use restrictions. A token service may be in communication with a token vault maintained by the content hub 306 in which the generated tokens are stored in relation to account information. Specifically, the token vault may maintain a mapping between a token and the real account identifier (e.g., PAN) represented by the token. During transaction processing, the token vault may be queried to retrieve the real account identifier or PAN associated with the token. For example, upon receiving a request (e.g., from a mobile device) to complete a purchase for an item, the content hub 306 may identify a token included in the request, query a PAN, and complete the requested transaction using the PAN.

In some embodiments, the content hub 306 may also be configured to generate a dynamic key (e.g., a limited-use key) associated with a token, mobile device, and/or account. For example, the content hub 306 may provide a dynamic key to a mobile device that may be used to generate a cryptogram to conduct a transaction. When verifying a purchase of a presented item by the mobile device, the token server may independently generate a cryptogram from the dynamic key associated with the token and compare it to a cryptogram provided in the purchase request received from the mobile device. In some embodiments, the content hub 306 may be communication with a third party token service provider (e.g., a token service provider unaffiliated with the content hub 306).

At step 6 of the data flow, the mobile application server 308 may convey a transaction request to the content hub 306. As discussed above, the transaction request may originate from the mobile device 310. This transaction request may include an indication of a resource for which a transaction is to be conducted as well as account information (e.g., a payment token) to be used to complete the transaction. In some embodiments, the mobile device may provide only an indication to initiate a transaction for a resource and the mobile application server 308 may identify the payment token (or other account information) that it maintains in relation to an account associated with the mobile device 310. The mobile application server 308 may generate a transaction request that includes this information (or any other suitable information) on behalf of the user. In some embodiments, a secure communication session between the mobile device 310 and the content hub 306 may be established, with the mobile application server 308 acting as a proxy device that routes communications between the two. In some embodiments, a secure communication session may be established between the content hub 306 and the mobile device 310 that excludes the mobile application server 308. For example, the mobile application executed on the mobile device 310 may be provided a network address for the content hub 306 to which communications may be routed. In this example, the mobile application may cause the mobile device 310 to communicate with the content hub 306 directly at this network address. In some embodiments, the mobile device 310 may communicate directly with a transaction processing network 312 or a resource provider (e.g., an electronic retailer). For example, the mobile device may initiate a transaction with a resource provider by accessing a link in a provided resource-related content. In this example, value add messaging fields may be used to indicate loyalty point usage for the transaction as well as any other information to be provided to the content hub 306. The information in the value add messaging fields may be provided to the content hub 306 by the transaction processing network 312.

At step 7 of the data flow, the content hub 306 may generate an authorization request message based on the transaction request and may subsequently provide the generated authorization request message to a transaction processing network 312. At step 8 of the data flow, the content hub 306 may receive an authorization response message from the transaction processing network 312 indicating whether the transaction is approved or declined. The content hub 306 may complete the requested transaction upon receiving this authorization response message.

At step 9 of the data flow, the content hub 306 may provide a notification to the content provider 302 to indicate that the resource has been purchased. In some cases, this transaction may cause the resource to be removed from an electronic catalog. For example, the content provider 302 may indicate a resource that is unique (e.g., there is only one available). Upon detecting that this unique item is no longer available, information stored in relation to the item may be updated to indicate that the item is no longer available so that future data files may not be associated with the resource identifier.

At step 10 of the data flow, a notification may be provided to the mobile application servers 308 to indicate that the requested transaction has been completed. In some embodiments, the content hub 306 may provide an indication of a commission or fee that is to be paid to the mobile application server 308 based on the completed transaction. The mobile application server 308 may update account information associated with the transaction based on the transaction details.

At step 11 of the data flow, a notification may be provided to the mobile device 310 to indicate that the transaction has been completed. For example, the mobile device 310 may be provided with an indication that includes any information relevant to the transaction.

Figure 4:
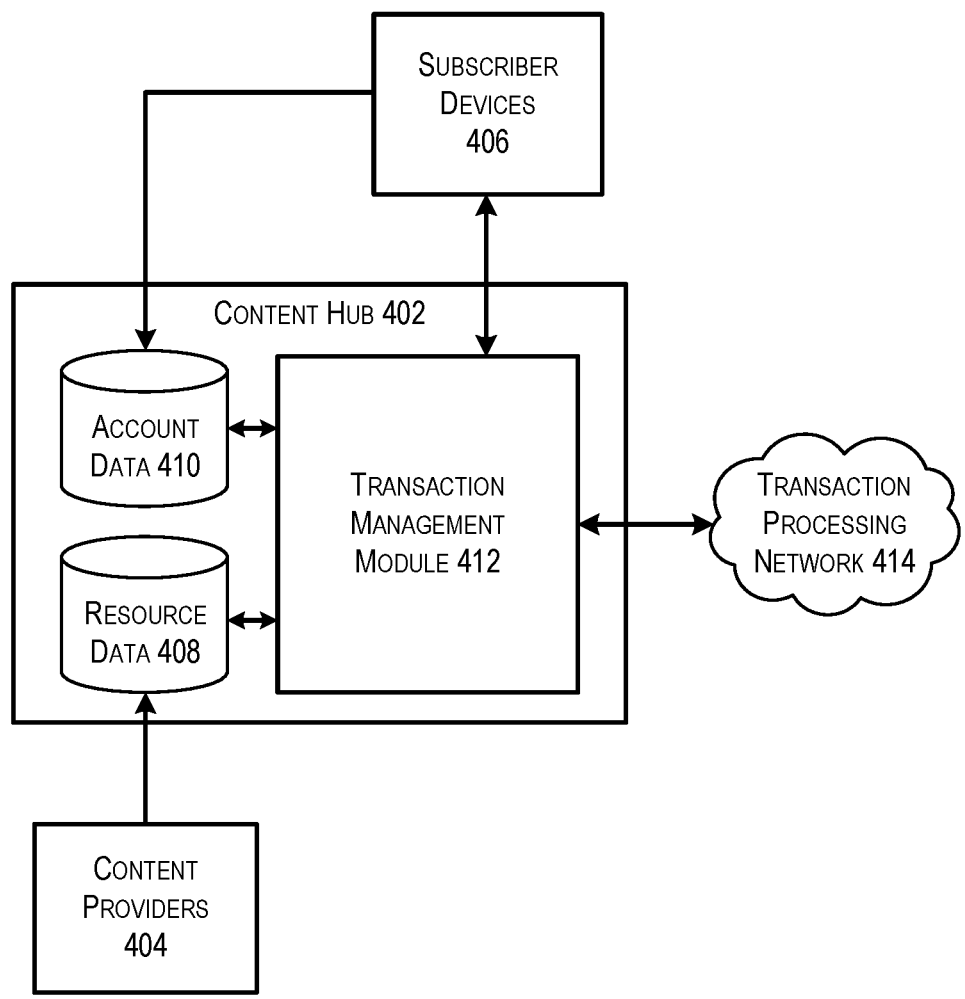
FIG. 4 depicts an example of a transaction management system that may be implemented by a content hub in accordance with at least some embodiments.

FIG. 4 depicts an example of a transaction management system that may be implemented by a content hub in accordance with at least some embodiments. Content hub 402 may be an example content distribution hub 104 depicted in FIG. 1 and/or FIG. 2. Content hub 402 may be in communication with a plurality of content providers 404 as well as a number of subscriber devices 406. In some embodiments, the subscriber devices 406 may be mobile application servers as described in this disclosure. In some embodiments, the subscriber devices 406 may be mobile devices owned and/or operated by users. The content providers 404 may be any entity affiliated with the media or resource-related content provided to users. In some embodiments, the content providers 404 may be distributors of the resource-related content itself. In some embodiments, the content providers 404 may be advertisers or suppliers of resources depicted in the resource-related content.

In some embodiments, the content providers 404 may provide information associated with a resource to the content hub 402. For example, the content providers 404 may provide information on a product or service to be offered for sale. Information associated with the resource may include any suitable resource-related data. For example, the information associated with a resource may include availability data, pricing data, dimension data (e.g., height, weight, etc.), or any other suitable information relevant to the resource. In some embodiments, the resource may be a unique resource (e.g., there is only one available) or a limited resource (e.g., there is a specific number of the resource available). The resource may be relevant to a media presentation. For example, if a content provider is airing a basketball game, the content provider may provide information on a jersey that is being worn by one of the players. The information on this jersey provided to the content hub 402 may be used to create an entry in an electronic catalog for the jersey. As described elsewhere in the disclosure, when the jersey (or the player wearing the jersey) is presented in the airing of the basketball game, information regarding the jersey may be presented to a number of subscribers. In this example, the information on the jersey may be provided to the content hub 402 as it is being presented during the basketball game or before the basketball game is to be aired. In the case that the catalog entry is created before the basketball game is aired, the content providers 404 may provide an indication when the jersey is being presented (e.g., the content providers 404 may provide an identifier for the catalog entry).

In some embodiments, the content providers 404 may be given the ability to restrict or elect which subscribers are able to receive resource-related content. For example, the content providers 404 may make available resources to a specific set of users. In some embodiments, the content hub 402 may maintain information in a user's account that indicates the user is able to subscribe to resource-related content from a particular content provider 404. In another example, the content provider 404 may provide a set of users to which the resource-related content should be provided. In at least some of these embodiments, the set of users may be provided by the content providers 404 to the content hub 402 along with the resource identifier.

In some embodiments, the content hub 402 may maintain information on various resources received from content providers 404 in a resource database 408. Resource database 408 may be an electronic catalog, with each entry of the electronic catalog being associated with a resource. Resource data 408 may be an example of resource-related content data 218 depicted in FIG. 2. In some embodiments, entries of the electronic catalog may pertain to auction information for a resource. For example, each entry in the electronic catalog may pertain to an auction of a particular resource, and may include bidding information.

In some embodiments, a content provider may create an entry for every item that may potentially be offered during a media presentation before that media presentation occurs. In this scenario, each entry may become activated when the content hub 402 receives an identifier for the item associated with that entry. By way of illustrative example, consider a content provider 404 that is scheduled to present a baseball game. In this example, the content provider 404 may create separate electronic catalog entries for each jersey worn by each player scheduled to appear in the game. At any given time during the airing of the baseball game, the content provider may initiate an auction for a particular player's jersey by providing an indication of either the jersey or the player. In some embodiments, this may be automated by the content provider 404. For example, the content provider 404 may indicate conditions upon which an item identifier may be provided to the content hub 402 without human interaction. In the example above, the content provider may indicate that an identifier should be provided for any player that gets two homeruns in the baseball game. In this example, if Player A gets two homeruns, the content provider may automatically send an identifier to the content hub 402 to activate an auction associated with the electronic catalog entry for Player A's jersey. Notifications related to the auction may then be generated and distributed in accordance with the invention. In another example, a particular player may be close to setting a record or performing some feat. Upon detecting that the record has been broken or the feat has been accomplished, the content provider may automatically send an identifier to the content hub 402 to activate an electronic catalog entry. In some embodiments, the content provider may use an interest detection technique to determine an identifier to be provided to the content hub 402. For example, upon detecting that a particular player has been mentioned several times by announcers or social media, the content provider 404 may automatically provide an identifier for that player to the content hub 402.

In some embodiments, an entry in the electronic catalog may include dynamic elements. For example, a price associated with the electronic catalog entry may be determined based on a number of subscriber devices 406 associated with the electronic catalog entry. For example, if the price may be proportional to the number of subscribers such that it is increased as more devices subscribe to the entry. In another example, the price may be proportional to a number of times that similar items have been purchased or bid upon in the past. In some embodiments, a price for the item may be proportional to a number of times that an item is searched via a website or browser application.

In some embodiments, electronic catalog entries may be activated and deactivated very rapidly. In some embodiments, the electronic catalog may be deactivated once the item listed in the electronic catalog is sold. In some embodiments, electronic catalog entries may have a very limited lifespan. For example, a catalog entry may remain active for only a few minutes. By way of illustration, a catalog entry for a resource may be activated upon receiving an identifier for that resource. A link to the electronic catalog entry (the corresponding resource-related content) may quickly be provided to any relevant subscribers and the catalog entry may be set to expire (i.e., be deactivated) within a few minutes of providing the resource-related content to the subscribers. This serves a dual purpose in that the resource-related content is provided to potentially interested parties at the time that they are most interested in the resource, and users are encouraged to act quickly to procure the resource.

In some embodiments, each of the subscriber devices 406 may be associated with account data 410. The account data 410 may include any information relevant to a subscriber device 406. For example, the account data 410 may include subscription data. The account data 410 may also include any information relevant to an account maintained with respect to a subscriber device 406. For example, the account data 410 may include token information and/or other payment information associated with a user of a subscriber device 406. In another example, the account data 410 may include shipping information associated with a user of a subscriber device 406.

Subscription data may comprise an indication of conditions upon which resource-related content should be provided to various subscriber devices 406. For example, subscription data may include an indication of media presentations, content providers 404, resources, types of resources, or any other suitable condition under which the subscriber device 406 should be provided resource-related content by the content hub 402. In some embodiments, a user of the subscriber device 406 may select channels to which the subscriber device 406 should be subscribed. A channel may be an indication of a content provider 404 or a category of content providers 404. For example, selecting a "Team A" channel (where Team A refers to particular football team) may cause the subscriber device 406 to be provided any resource-related content related to a content provider that provides media presentations on Team A. In another example, selecting a "football" channel may cause the subscriber device 406 to be provided any resource-related content related to a content provider that provides media presentations on football games.

Upon being provided an indication that a resource in the resource data 408 is currently being presented (e.g., a data file being presented depicts the resource), the content hub 402 may generate a resource-related content to be provided to the subscriber devices 406 in accordance with subscription data maintained by the content hub 402. In some embodiments, an instance of a resource offer may be instantiated by a transaction management module 412. The transaction management module 412 may, in conjunction with a processor of the content hub 402, be configured to manage status information in relation to a number of open resource offers. Each resource offer may comprise an offer (e.g., a sale offer) related to an entry in the electronic catalog. Upon resource-related content being provided to various subscriber devices 406 by the content hub 402, the transaction management module 412 may aggregate information in any responses received from those subscriber devices 406. Based on this aggregated response data, the transaction management module 412 may update the resource offer and/or a corresponding entry in the electronic catalog. Each time that an update is made in this way, the content hub 402 may push the update to the subscriber devices 406. In this way, the transaction management module 412 may maintain a current status of the resource offer across multiple subscriber devices 406.

In some embodiments, the transaction management module 412 may be configured to cause the content hub 402 to initiate a transaction with a subscriber device 406 (or a mobile device associated with the subscriber device 406). For example, upon receiving a request from a subscriber device 406 to conduct a transaction associated with a particular resource offer, the transaction management module 412 may generate an authorization request message to be routed to an issuer associated with a potential party to the transaction via a transaction processing network 414. In some embodiments, the transaction management module 412 may receive an indication of the party to the transaction in the request message, and may subsequently identify payment information associated with that party within the account data 410. An authorization request message may then be generated using that payment information. In some embodiments, the transaction management module 412 may complete the transaction upon receiving an approved authorization response message.

By way of providing an illustration of the described transaction management system, consider a scenario in which a user of a subscriber device 406 subscribes to a content channel associated with his singer. In this example, each time that a content provider 404 streams a live concert for that singer, information on items appearing in the stream are separately provided to a content hub, which may then identify advertisements/notifications related to those items. The identified advertisements may be sent to the user's mobile device (as well as to a number of other mobile devices associated with other users). This may be done in real-time (e.g., as the item is being presented in the live stream) or substantially real-time (shortly following presentation of the item). In this way, as the user views a media presentation on a first device, he or she is also provided a stream of item-related information on a second device (i.e., content that is supplemental to the media presentation). This increases the effectiveness of the presented advertisement as the user's interest is at a peak during the time that the advertisement is being presented. For example, as the user views the live concert (e.g., live, on a radio, on a television, etc.) the user may receive an indication that the jacket being worn by the singer is available, etc. In some cases, the notification may be for a jacket similar to the one being worn by the singer (e.g., the same brand and model). In some cases, the jacket may be the exact jacket being worn by the singer (e.g., a unique item).

Figure 5:
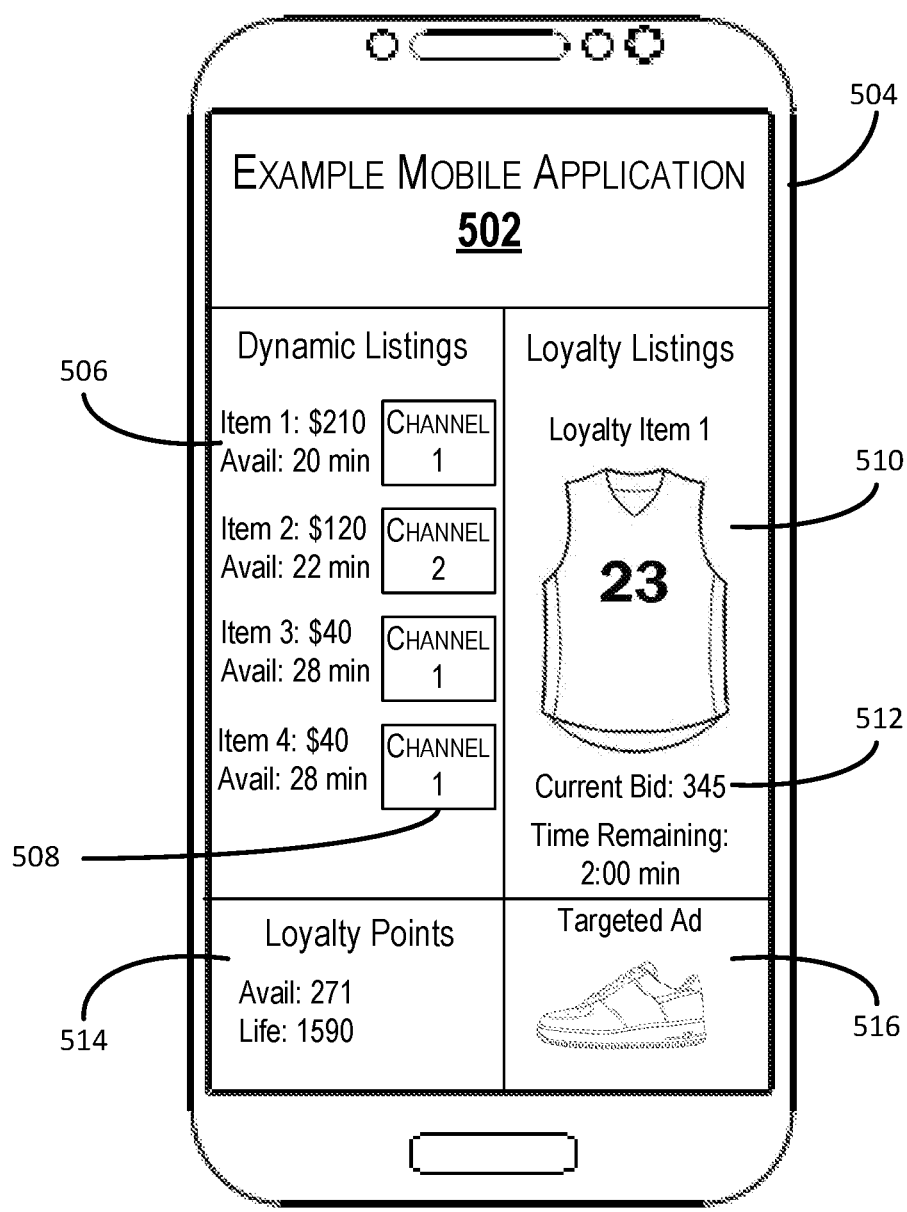
FIG. 5 depicts example elements of a graphical user interface that may be presented by a mobile application in accordance with at least some embodiments.

FIG. 5 depicts example elements of a graphical user interface (GUI) that may be presented by a mobile application in accordance with at least some embodiments. In FIG. 5, several elements are depicted as being implemented within an example mobile application 502 that may be stored on, and executed by, a mobile device 504.

In some embodiments, the mobile device 504 may be subscribed to various content channels such that it is provided with resource-related content that is relevant to data file currently being presented in association with those channels. In some embodiments, the mobile application 502 may display one or more resource-related notifications 506 based on the subscribed-to channels. These resource-related notifications 506 may include an indication 508 of the channel or a content provider as well as various information associated with the resource to which the resource-related notification 506 is related.

In some embodiments, the mobile application 502 may display information on a resource offer 510. In some embodiments, a resource offer 510 may take the form of an auction or other listing for the resource. The resource offer 510 may include pricing information 512, a description, a title, or any other suitable resource-related information. In some embodiments, a user may initiate a transaction for one or more of the resources depicted in the resource-related notification or the resource offer. In some embodiments, currency may be used to complete a requested transaction (e.g., via payment information provided to the content hub). In some embodiments, loyalty or reward points may be used to complete a transaction. For example, a user of the mobile application 502 may receive loyalty points for each minute that the user spends with the mobile application 502 open. In some embodiments, a transaction may be completed with some combination of currency and loyalty points. Loyalty point information 514 may be maintained by a mobile application server that provides support for the mobile application 502 or the content hub. In some cases, the content hub may provide resource-related notifications to a number of different mobile application servers (and subsequently to a number of different mobile applications 502). In these cases, the content hub may maintain loyalty point information 514 for each of the different mobile application servers. In some embodiments, a content hub may maintain separate loyalty point information based on categories or channels. For example, the content hub may maintain football loyalty points separately from concert loyalty points.

In some embodiments, a content hub may include a number of features directed to building loyalty/goodwill with a user of a mobile application that subscribes to resource-related content. Loyalty points may be credited to a user's account in a number of ways. For example, users of mobile applications may receive loyalty or reward points (e.g., miles) based on time spent on the application (e.g., per minute), based on an a total amount spent using the application (e.g., dollars spent in transactions), based on a number of transactions conducted using the application, and/or based on any other suitable factor. In some embodiments, a user may gain bonus loyalty points for meeting specific conditions. For example, a user may be given bonus points for subscribing to consecutive events (e.g., subscribing to each event in a multi-part series, or subscribing to multiple concerts or other events). In some embodiments, the user may be given loyalty points for signing up new users. In some embodiments, loyalty points may be awarded to a user for advertising the mobile application on, or posting about the mobile application on, social media. Loyalty points may be awarded to a user via a code acquired from another source (e.g., a website, social media, a store receipt, etc.). In some embodiments, loyalty points may be awarded to a user that is singed onto the mobile application at the time that specific conditions are met. For example, a user that is signed onto a mobile application associated with a baseball team at the time that the baseball team wins a game may be awarded bonus points. In some embodiments, the user may be given the ability to purchase loyalty points.

In some embodiments, the mobile application 502 may also present targeted advertisements 516. These targeted advertisements may be provided by the content hub, or by a third party entity (e.g., an entity unaffiliated with the content hub and mobile application server). These targeted advertisements 516 may be provided in a separate stream. In some embodiments, the advertisements may be selected based on indicated user preferences, subscribed-to channels, or any other user-specific factors.

Figure 6:
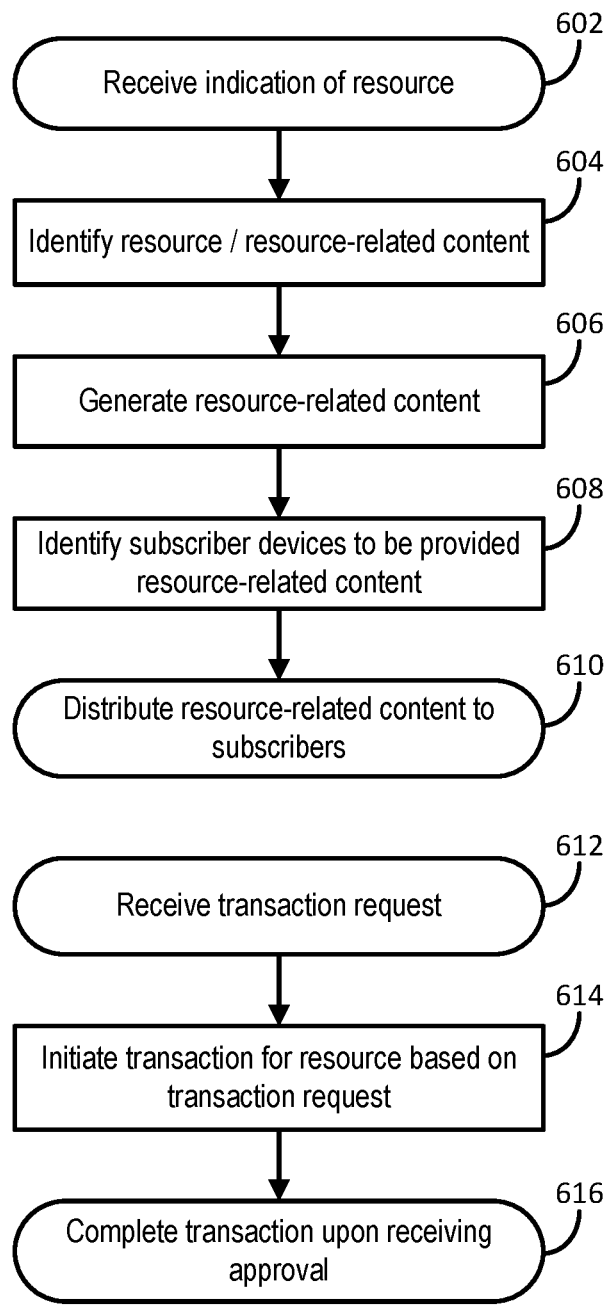
FIG. 6 depicts a flow diagram illustrating a process for receiving resource-related content from a content provider and distributing the resource-related content to subscriber devices in accordance with at least some embodiments.

FIG. 6 depicts a flow diagram illustrating a process for receiving resource-related content from a content provider and distributing the resource-related content to subscriber devices in accordance with at least some embodiments.

Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the content distribution hub 104 depicted in FIG. 1 and FIG. 2. The code may be stored on a computer-readable storage medium, for example, in the form of a computer program including a plurality of instructions executable by one or more processors. The computer-readable storage medium may be non-transitory.

Process 600 may begin at 602, when an indication of a resource is received by the content hub. The indication of a resource may be received from a content provider. In some embodiments, the indication may be provided in metadata associated with a portion of streaming data. In some embodiments, the indication may simply comprise a resource identifier transmitted to the content hub.

At 604, a resource related to the received indication may be identified by the content hub. In some cases, advertisements or other resource-related content may be identified as being relevant to the identified resource. For example, the content hub may query a data store to identify any potentially relevant resource-related content. The query may be performed based on the resource identifier. In some embodiments, the resource-related content may be associated with an entry in an electronic catalog.

At 606, in some embodiments, resource-related content may be generated for the resource by the content hub. For example, upon receiving information related to a resource from a content provider, the content hub may determine that there is currently no relevant stored resource-related content. In some embodiments, the content hub may generate a resource-related content by creating an entry in an electronic catalog for the resource and populating fields of the entry with information provided by the content provider. In some embodiments, the content hub may generate an auction to be associated with the identified resource. In some embodiments, the content hub may receive a portion of a data file from the content provider with an indication of an item. In some cases, the content hub may edit the portion of the data file to be resource-related. For example, upon receiving a portion of video depicting a football player that is wearing a pair of Brand A shoes, the content hub may determine (e.g., based on metadata associated with the portion of video) that the portion of video is associated with Brand A and may overlay an Brand A logo onto the portion of video.

At 608, the content hub may identify subscriber devices to be provided resource-related content. The content hub may identify these subscriber devices based on maintained subscription data. In some embodiments, a mobile application installed on, and executed from, a user's mobile device may subscribe to particular content. For example, in some embodiments, a user's mobile device may be in communication with a media presentation device (e.g., a television) and may determine that the user is viewing a particular event or program. Upon making this determination, the mobile device may automatically (e.g., without further human interaction) subscribe to a channel associated with the event or program with the content hub.

At 610, the resource-related content may be distributed to various subscriber devices. In some embodiments, the resource-related content may be provided to a number of mobile application servers and subsequently provided to a number of mobile applications supported by those mobile application servers. In some embodiments, the resource-related content may be provided to the subscriber devices by being pushed to those subscriber devices. In some embodiments, the resource-related content may be placed on a server at a particular location and an address for that resource-related content may be provided to the subscriber devices to allow them to retrieve that data. In some embodiments, a resource-related data file may be provided as a series of data files. For example, a video to be provided to subscriber devices may be provided as a series of sequential two-second chunks of video.

As described above, the content hub may comprise multiple processing nodes, each of which may be capable of processing a number of received resource identifiers. In some embodiments, the content hub may be capable of increasing or decreasing the number of active processing nodes in order to meet demand (i.e., scaling). In some embodiments, each received resource identifier may be assigned to one or more processing nodes, allowing the resource identifiers to be processed in parallel. In some embodiments, a processing node may be assigned to handle one resource identifier at any given time. For example, when a resource identifier is received at the content hub, one or more processing nodes may be assigned to the received identifier. The processing nodes may query data stores for resource-related content relevant to that received resource identifier, identify any potential subscribers, and generate notifications to each of those subscribers. In some embodiments, the resource identifier may be assigned to a single processing node when it is received at the content hub. The processing node may subsequently identify subscribers relevant to the resource. In this example, each identified subscriber may subsequently be assigned one or more processing nodes specific to both the subscriber and the resource. In this way, resource-related content may be provided to a number of subscribers in parallel.

At 612, the content hub may receive a transaction request associated with the resource. For example, after providing the resource-related content to a number of subscriber devices, the content hub may receive a request to purchase the resource related to the resource-related content. In this example, the transaction request may identify a subscriber device, a potential purchaser (e.g., user), payment information (e.g., a token), or any other relevant information.

At 614, the content hub may initiate a transaction for the resource on behalf of a user that submitted the transaction request. In some embodiments, the content hub may maintain payment information for a user identified in the transaction request. In at least some of these embodiments, the content hub (or an acquirer computer associated with the content hub) may generate an authorization request message to determine whether the transaction should be conducted. The authorization request message may be routed to an issuer of the user's payment information via a transaction processing network.

At 616, the content hub may complete the transaction upon receiving approval. For example, the content hub, after routing the authorization request message to the issuer of the user's payment information via the transaction processing network, may receive an authorization response message indicating that the transaction is approved. Upon receiving this approval, the content hub may complete the transaction by indicating that the resource has been sold to the user indicated in the transaction request. In some embodiments, a notification may be provided to the user and/or the content provider that the transaction has been completed. The notifications may be customized to a particular user. For example, the notifications may include information derived from an account associated with the user. In some embodiments, the content hub may include a number of notification templates, each of which includes one or more active fields. Upon generating a notification for a particular user, the content hub may select a template and may subsequently populate fields within that template with information specific to the user. The generated notification may then be provided to a user's mobile device. In some embodiments, the resource may subsequently be provided to the user via a fulfillment process.

As mentioned above, the content hub may comprise a number of processing nodes. In some embodiments, transactions may be assigned to separate processing nodes such that they may be processed in parallel, allowing a large number of transactions to be processed very quickly. In some embodiments, each processing node may reserve (e.g., prevent write access to) a database entry that is currently being edited by that processing node in order to prevent overwrite by other processing nodes processing transactions related to the same resource. In some embodiments, transactions may be aggregated for processing. For example, transactions directed to a specific resource may be aggregated and processed by a processing node or group of processing nodes. In this example, the transactions may be processed in a batch.

Figure 7:
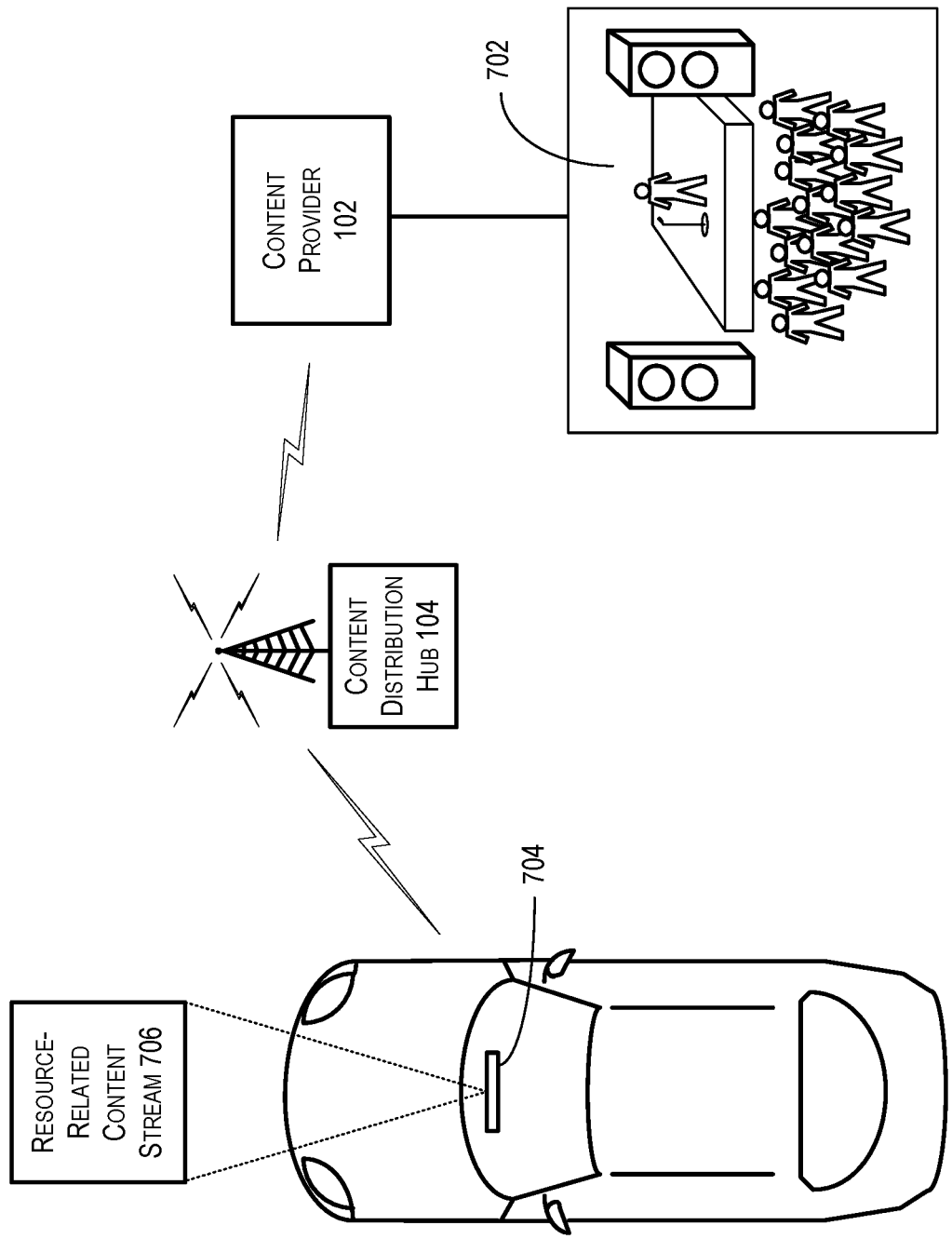
FIG. 7 depicts an example of an illustrative implementation of the described disclosure.

FIG. 7 depicts an example of an illustrative implementation of the described disclosure. The example depicted in FIG. 7 is illustrative and is not intended to be limiting. In FIG. 7, a live event 702 is depicted as occurring. Resource information in this illustrative example may be provided via a content provider 102.

The content provider 102 may report resource identifiers to a content distribution hub 104. The content distribution hub may identify resource-related content based on the resource identifiers received from the content provider 102 and may provide the resource-related content to a mobile device 704. The mobile device 704 may present the provided resource-related content to a user in the form of a resource-related content stream 706.

In the illustrative example, a live event 702 may be any event occurring in real time. For example, the live event may be a sporting event, a concert, a political rally, a speech, a festival, or any other suitable event that may interest an individual. Live events may be broadcast (e.g., televised) or they may not be broadcast. During a live event 702, one or more curators may provide (either intentionally or otherwise) an identifier of a resource associated with the live event 702. In some embodiments, the live event 702 may be followed by a number of users via a social media presence.

The content provider 102, in some embodiments, may not actually provide any traditional data file. For example, in the present illustration, the content provider 102 may be a comment feed provided by a social media website. In this example, each time that a social media participant mentions the live event in relation to a product, the content distribution hub 104 may provide content related to that product to subscribed devices.

As pointed out above, a mobile device may embody any suitable portable device. For example, the mobile device may be an onboard vehicle system as depicted in FIG. 7. The mobile device may be provided a stream of resource-related content 706 in real time. For example, resource-related content may be provided to the mobile device 704 and presented to a user (e.g., an operator of the vehicle in the current illustration) as it becomes relevant. In some embodiments, the mobile device 704 may be provided resource-related content based on a number of factors. For example, as an operator of a vehicle in which the mobile device 704 is installed travels, the mobile device 704 may be subscribed to different resource-related content based on geographic location. In this way, the mobile device 704 is provided a number of resource-related content items in real time as those resource-related content items become relevant.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention allow for a number of users to receive similar resource-related notifications across a multitude of different platforms despite having different interests. All the while, embodiments of the invention are able to maintain a core set of data for the resource. For example, users of a football mobile application and users of a Brand B mobile application may both receive information related to a pair of Brand B running shoes being worn by a particular football player that is depicted during a televised football game. However, the information may be presented in a different fashion by each of the football mobile application and the Brand B mobile application. Despite being presented in different ways, users of both mobile applications are provided the running shoe related notifications as they become relevant and are able to interact with a listing for the running shoes. Some embodiments of the disclosure also enables users to select channels such that they are provided a stream of resource-related notifications on a second device that compliment another media presentation that they are currently viewing on a first device.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of policies, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server apparatus comprising:
   a processor; and
   a memory including instructions that, when executed with the processor, cause the server apparatus to, at least:
   receive, from one or more content providers, an indication of a resource related to a media presentation being presented by the one or more content providers, the resource related to the media presentation by virtue of being depicted within the media presentation, wherein the indication comprises a resource identifier;
   identify, within a data store, at least one resource-related content associated with the indicated resource;
   maintain, by the server apparatus, subscription data indicating one or more user-defined preferences for each of a plurality of subscribers;

identify, by the server apparatus, one or more user-defined preferences that correspond to the indicated resource;

determine, based at least in part on the subscription data maintained by the server apparatus, a subset of the plurality of subscriber devices to be provided the identified resource-related content different from devices to which the media presentation is being presented; and distribute, to each of the subscriber devices, the identified resource-related content independent from the media presentation being presented, wherein the identified resource-related content is distributed to each of the subscriber devices within a different stream of content generated using user-defined preferences corresponding to the respective subscriber device.

2. The server apparatus of claim 1, wherein the subscriber devices comprise mobile application servers, each of which further distributes the resource-related content to a plurality of mobile devices.

3. The server apparatus of claim 2, wherein each mobile device of the plurality of mobile devices include an instance of a mobile application supported by the mobile application servers.

4. The server apparatus of claim 3, wherein the plurality of mobile devices are selected based on user preferences maintained by the mobile application server.

5. The server apparatus of claim 3, wherein the instructions further cause the server apparatus to at least establish a communication session with a mobile device of the plurality of mobile devices with the mobile application server acting as a proxy device that routes communications between the server apparatus and the mobile device.

6. The server apparatus of claim 1, wherein the instructions further cause the server apparatus to at least:

receive, from a subscriber device of the plurality of subscriber devices, a transaction request; and initiate a transaction indicated in the transaction request.

7. The server apparatus of claim 6, wherein the transaction request is generated by the subscriber device on behalf of a user using information maintained in an account associated with the user.

8. The server apparatus of claim 7, wherein the transaction request includes a token.

9. A method comprising:

receiving, at a server device from a content provider, information associated with a resource related to a presented data file, the resource related to the presented data file by virtue of being depicted within the presented data file, wherein the information associated with the resource comprises a resource identifier included within metadata appended to the presented data file;

identifying, by the server device, a resource-related content to be associated with the resource, the resource-related content including information for conducting a transaction with respect to the resource;

maintaining, by the server device, subscription data indicating one or more user-defined preferences for each of a plurality of subscriber devices;

identifying, by the server device, one or more subscriber devices that are subscribed to the presented data file based on one or more user-defined preferences corresponding to the indicated resource;

providing, by the server device while the depiction of the item within the data file is being presented to one or more media presentation devices, the resource-related content to the one or more subscriber devices that are subscribed to the presented data file, wherein the one or more subscriber devices are different from the media presentation devices, wherein the resource-related content is provided to each of the subscriber devices within a different stream of content generated using user-defined preferences corresponding to the respective subscriber device;

receiving, by the server device with respect to the provided resource-related content, a request to complete a transaction for the resource; and initiating, by the server device, the requested transaction for the resource.

10. The method of claim 9, wherein the requested transaction for the resource is at least partially completed using loyalty points maintained with respect to the subscriber device.

11. The method of claim 10, wherein the information associated with the resource related to the presented data file includes a streaming data.

12. The method of claim 11, wherein the streaming data is a series of data files.

13. The method of claim 12, wherein the series of data files are made available for download at a network location.

14. A transaction management system comprising:

a processor; and a memory including instructions that, when executed with the processor, cause the transaction management system to, at least:

receive, in relation to a media presentation, information associated with a resource to be added to an electronic catalog, the resource related to the media presentation content by virtue of being depicted within the media presentation, wherein the information associated with the resource comprises a resource identifier included within metadata appended to the presented data file;

generate an entry in the electronic catalog for the resource;

maintain subscription data indicating one or more user-defined preferences for each of a set of subscriber devices;

identify one or more user-defined preferences that correspond to the indicated resource;

identify, based on subscription data maintained by the transaction management system, a plurality of subscriber devices to be provided a notification associated with the entry in the electronic catalog based on the one or more user-defined preferences for the plurality of subscriber devices;

provide, to each of the identified plurality of subscriber devices independent of the media presentation, the generated notification to be displayed upon the plurality of subscriber devices while the depiction of the resource within the media presentation is being presented, wherein the generated notification is provided to each of the plurality of subscriber devices within a different stream of content generated using user-defined preferences corresponding to the respective subscriber device.

15. The transaction management system of claim 14, wherein the notification provided to each of the plurality of subscriber devices is tailored to that subscriber device.

16. The transaction management system of claim 14, wherein the instructions further cause the transaction management system to:

receive responses from one or more of the plurality of subscriber devices;

aggregate data related to the entry in the electronic catalog from each of the received responses; and update the entry in the electronic catalog based on the aggregated data.

17. The transaction management system of claim 14, wherein the received responses comprise offers for the resource.

18. The server apparatus of claim 1, wherein the plurality of subscriber devices are subscribed to the media presentation upon determining that the plurality of subscriber devices are associated with the devices to which the media presentation is being presented.

19. The server apparatus of claim 1, wherein the plurality of subscriber devices are subscribed to the media presentation upon receiving an indication from the plurality of subscriber devices indicating that the plurality of subscriber devices are in communication with at least one of the devices to which the media presentation is being presented.

20. The server apparatus of claim 1, wherein the instructions further cause the server apparatus to:

receive a second indication of a second resource related to a second media presentation being presented by a second content provider of the one or more content providers concurrent to the first media presentation;

distribute, to at least a portion of the subscriber devices, a second resource-related content related to the second media presentation, the portion of the subscriber devices determined based on the one or more user-defined preferences.

* * * * *